United States Patent
Saiki et al.

(10) Patent No.: US 11,072,150 B2
(45) Date of Patent: Jul. 27, 2021

(54) LAMINATED BODY, METHOD FOR PRODUCING LAMINATED BODY, AND REARVIEW MIRROR FOR VEHICLE

(71) Applicant: FUJIFILM Corporation, Tokyo (JP)

(72) Inventors: Yuki Saiki, Minamiashigara (JP); Takao Taguchi, Minamiashigara (JP); Katsuyuki Takada, Minamiashigara (JP); Mikio Tomaru, Minamiashigara (JP)

(73) Assignee: FUJIFILM Corporation, Tokyo (JP)

( * ) Notice: Subject to any disclaimer, the term of this patent is extended or adjusted under 35 U.S.C. 154(b) by 248 days.

(21) Appl. No.: 16/450,188

(22) Filed: Jun. 24, 2019

(65) Prior Publication Data

US 2019/0310407 A1     Oct. 10, 2019

Related U.S. Application Data

(63) Continuation of application No. PCT/JP2017/034122, filed on Sep. 21, 2017.

(30) Foreign Application Priority Data

Jan. 10, 2017    (JP) .............................. JP2017-001821

(51) Int. Cl.
*B32B 17/10*     (2006.01)
*B32B 7/023*     (2019.01)
(Continued)

(52) U.S. Cl.
CPC ............... *B32B 17/10* (2013.01); *B32B 7/02* (2013.01); *B32B 7/023* (2019.01); *B32B 7/12* (2013.01);
(Continued)

(58) Field of Classification Search
CPC ... B32B 17/064; B32B 17/10; B32B 2250/05; B32B 2250/42; B32B 2307/416;
(Continued)

(56) References Cited

U.S. PATENT DOCUMENTS

2009/0079909 A1    3/2009   Ouderkirk et al.
2014/0287211 A1    9/2014   Oya et al.
(Continued)

FOREIGN PATENT DOCUMENTS

CN    1142869 A     2/1997
EP    0736188 B1    8/2002
(Continued)

OTHER PUBLICATIONS

Japanese Office Action dated Oct. 13, 2020 for corresponding Application No. 2017/001821 with an English translation.
(Continued)

*Primary Examiner* — Lawrence D Ferguson
(74) *Attorney, Agent, or Firm* — Birch, Stewart, Kolasch & Birch, LLP (57) ABSTRACT

A laminated body sequentially includes a substrate, an adhesive layer, and a multilayer film. The laminated body has characteristics of transmitting first polarized light and reflecting second polarized light having a polarization axis x that intersects a polarization axis y of the first polarized light. The multilayer film includes a plurality of first layers formed of a crystalline naphthalenedicarboxylic acid polyester and a plurality of second layers formed of a polymer other than the crystalline naphthalenedicarboxylic acid polyester, the first layers and the second layers being alternately stacked on top of each other. The first layers have a higher refractive index than the second layers on the polarization axis of the second polarized light, and the multilayer film has a thermal expansion coefficient of $-80$ $[10^{-6}/K]$ or more at
(Continued)

a temperature 3° C. higher than a glass transition point of the multilayer film in the polarization axis direction of the first polarized light.

8 Claims, 3 Drawing Sheets

(51) Int. Cl.
| | | |
|---|---|---|
| *B32B 7/12* | (2006.01) | |
| *B32B 27/36* | (2006.01) | |
| *B32B 37/12* | (2006.01) | |
| *B60R 1/04* | (2006.01) | |
| *B60R 1/08* | (2006.01) | |
| *G02B 5/30* | (2006.01) | |
| *B32B 7/02* | (2019.01) | |

(52) U.S. Cl.
CPC .............. *B32B 27/36* (2013.01); *B32B 37/12* (2013.01); *B60R 1/04* (2013.01); *B60R 1/083* (2013.01); *G02B 5/30* (2013.01); *G02B 5/305* (2013.01); *B32B 2250/05* (2013.01); *B32B 2250/42* (2013.01); *B32B 2307/416* (2013.01); *B32B 2315/08* (2013.01); *B32B 2371/00* (2013.01); *B32B 2605/00* (2013.01)

(58) Field of Classification Search
CPC ............ B32B 2307/42; B32B 2315/08; B32B 2371/00; B32B 2551/08; B32B 2605/00; B32B 27/36; B32B 37/12; B32B 38/1875; B32B 7/02; B32B 7/023; B32B 7/12; B60R 1/04; B60R 1/083; G02B 5/0816; G02B 5/30; G02B 5/305
See application file for complete search history.

(56) References Cited

U.S. PATENT DOCUMENTS

| | | |
|---|---|---|
| 2016/0085006 A1 | 3/2016 | Akizuki et al. |
| 2016/0221508 A1 | 8/2016 | Takada et al. |

FOREIGN PATENT DOCUMENTS

| | | |
|---|---|---|
| JP | 9-506637 A | 7/1997 |
| JP | 2000-321560 A | 11/2000 |
| JP | 2011-141408 A | 7/2011 |
| JP | 2016-62027 A | 4/2016 |
| JP | 2016-142918 A | 8/2016 |

OTHER PUBLICATIONS

Chinese Office Action for corresponding Chinese Application No. 201780077669.2, dated Nov. 12, 2020, with an English translation.
Japense Office Action, dated Mar. 17, 2020, for corresponding Japanese Application No. 2017-001821, with an English translation.
International Preliminary Report on Patentability and Written Opinion of the International Searching Authority (forms PCT/IB/373, PCT/ISA/237 and PCT/IB/326), dated Jul. 25, 2019, for corresponding International Application No. PCT/JP2017/034122, with a Written Opinion translation.
International Search Report (form PCT/ISA/210), dated Dec. 19, 2017, for corresponding International Application No. PCT/JP2017/034122, with an English translation.
Extended European Search Report, dated Dec. 9, 2019, for corresponding European Application No. 17891392.0.

LAMINATED BODY, METHOD FOR PRODUCING LAMINATED BODY, AND REARVIEW MIRROR FOR VEHICLE

CROSS-REFERENCE TO RELATED APPLICATIONS

This application is a Continuation of PCT International Application No. PCT/JP2017/034122, filed on Sep. 21, 2017, which claims priority under 35 U.S.C. § 119(a) to Japanese Patent Application No. 2017-001821, filed on Jan. 10, 2017. Each of the above application(s) is hereby expressly incorporated by reference, in its entirety, into the present application.

BACKGROUND OF THE INVENTION

1. Field of the Invention

The present invention relates to a laminated body, a method for producing the laminated body, and a rearview mirror for vehicles including the laminated body.

2. Description of the Related Art

In recent years, multilayer films formed of polymers have been widely used for, for example, reflective polarizing plates and mirrors. Such a known multilayer film is, for example, a dual brightness enhancement film (hereafter referred to as "DBEF") disclosed in JP1997-506837A (JP-H09-506837A). The DBEF is produced by alternately stacking birefringent first optical layers subjected to uniaxial stretching or biaxial stretching and second optical layers having an isotropic refractive index that is substantially equal to one of in-plane refractive indices of the stretched layers. The DBEF substantially transmits light polarized in a plane parallel to the direction in which the refractive indices of the two layers are substantially equal to each other and reflects light polarized in a plane parallel to the direction in which the refractive indices of the two layers are different from each other. By using the DBEF for liquid crystal display devices or the like, light in a wide wavelength range from ultraviolet to infrared can be selectively reflected or transmitted and thus light can be efficiently extracted from a liquid crystal cell, thereby achieving high brightness.

However, such a multilayer film produced by performing stretching has a problem in that creases are easily formed at high temperature. To address this problem, JP2016-62027A proposes an adhesive layer-including polarizing plate that includes a protective film, a polarizing film, and an adhesive layer, wherein the shrinkage in an absorption axis direction is 0.4% or less. JP2000-321560A also proposes a cell substrate in which optical materials are bonded to a resin substrate with an adhesive layer disposed therebetween, wherein warping after heating at high temperature for a long time is reduced.

SUMMARY OF THE INVENTION

However, the multilayer film may be expanded in various applications. It is proposed that, for example, the multilayer film be used as a reflective polarizing plate for large-screen liquid crystal display devices and also be used for mirror displays of rearview mirrors for vehicles. In such an operating environment, the multilayer film is frequently exposed to high temperature and humidity. This requires a multilayer film in which formation of creases is further suppressed.

In view of the foregoing, it is an object of the present invention to provide a laminated body including a multilayer film in which formation of creases is suppressed under high temperature and humidity conditions, a method for producing the laminated body, and a rearview mirror for vehicles including the laminated body.

As a result of thorough studies, the present inventors have found that when the thermal expansion coefficient of a multilayer film is set in a particular range in advance and the multilayer film is bonded to a substrate with an adhesive layer disposed therebetween, a laminated body in which creases are not easily formed even under high temperature and humidity conditions is provided. Thus, the present inventors have completed the present invention.

That is, a laminated body according to an aspect of the present invention sequentially includes a substrate, an adhesive layer, and a multilayer film. The laminated body has characteristics of transmitting first polarized light and reflecting second polarized light having a polarization axis that intersects a polarization axis of the first polarized light. The multilayer film includes a plurality of first layers formed of a crystalline naphthalenedicarboxylic acid polyester and a plurality of second layers formed of a polymer other than the crystalline naphthalenedicarboxylic acid polyester, the first layers and the second layers being alternately stacked on top of each other. The first layers have a higher refractive index than the second layers on the polarization axis of the second polarized light. The multilayer film has a thermal expansion coefficient of $-80\times10^{-6}$/K ($-80\ [10^{-6}/K]$) or more at a temperature 3° C. higher than a glass transition point of the multilayer film in a polarization axis direction of the first polarized light.

The "transmitting" herein means that 95% or more of light having a wavelength of 450 nm to 650 nm is transmitted. The "reflecting" herein means that 80% or more of light having a wavelength of 450 nm to 650 nm is reflected.

The angle at which the polarization axis of the first polarized light intersects the polarization axis of the second polarized light is in the range of 87° to 93° and most preferably 90°.

The "glass transition point of the multilayer film" is a value obtained by measuring the whole multilayer film using thermomechanical analysis (TMA). For example, trade name "TMA" (manufactured by Hitachi High-Tech Science Corporation) can be used as a thermomechanical analyzer.

The reason for measurement "at a temperature 3° C. higher than the glass transition point" is as follows.

When the thermal expansion coefficient of the multilayer film is measured by thermomechanical analysis (TMA), a phenomenon is observed in which the thermal expansion coefficient rapidly changes near the glass transition point and then the thermal expansion coefficient is saturated. Therefore, the thermal expansion coefficient considerably varies at the glass transition point and the polymer may be denatured if the temperature is excessively high. At a temperature 3° C. higher than the glass transition point, the thermal expansion coefficient is sufficiently saturated, and a stable value with less variation can be obtained. For this reason, the thermal expansion coefficient is measured at a temperature 3° C. higher than the glass transition point.

The multilayer film is preferably stretched in the polarization axis direction y of the first polarized light to 98% or more of a breaking length at 25° C. in the polarization axis direction.

The "breaking length" herein is a length at which the multilayer film is broken when the whole multilayer film is stretched in the polarization axis direction of first polarized light using a stretching machine. The stretching machine that can be used is, for example, a high-performance film stretching machine "FITZ" (manufactured by ICHIKIN Co., Ltd.).

A method for producing a laminated body according to an aspect of the present invention is a method for producing the above laminated body according to an aspect of the present invention. The method includes setting the thermal expansion coefficient of the multilayer film to −80 [$10^{-6}$/K] or more and then bonding the multilayer film and the substrate with the adhesive layer disposed therebetween.

The multilayer film is preferably stretched in the polarization axis direction of the first polarized light to set the thermal expansion coefficient to −80 [$10^{-6}$/K] or more.

A rearview mirror for vehicles according to an aspect of the present invention is a rearview mirror for vehicles including the above laminated body according to an aspect of the present invention. A short-side direction of the rearview mirror for vehicles corresponds to the polarization axis direction of the first polarized light.

In the laminated body, the method for producing a laminated body, and the rearview mirror for vehicles according to embodiments of the present invention, formation of creases is favorably suppressed even under high temperature and humidity conditions.

DESCRIPTION OF THE PREFERRED EMBODIMENTS

Hereafter, the present invention will be described with reference to the attached drawings.

Laminated Body

A laminated body according to an embodiment of the present invention will be described.

Figure 1:
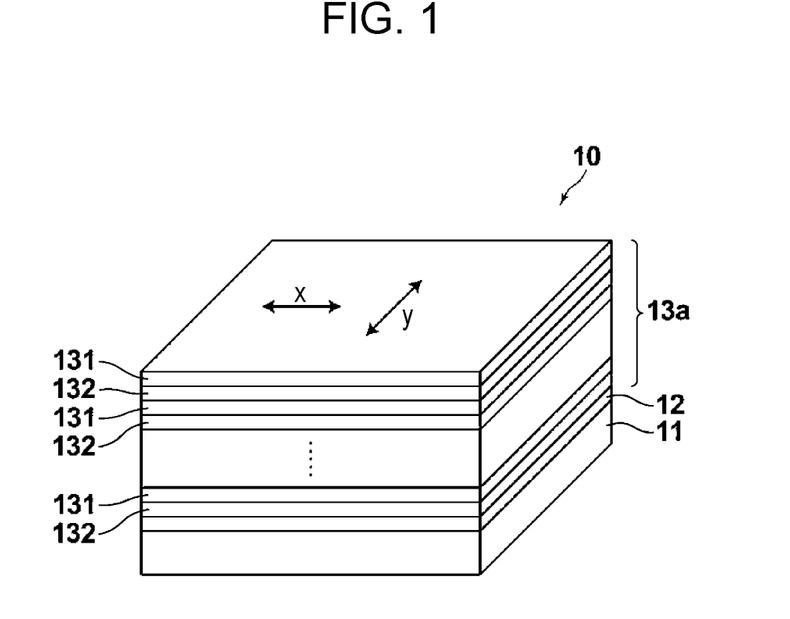
FIG. 1 is a schematic sectional view illustrating a laminated body.

As illustrated in FIG. 1, a laminated body 10 includes an adhesive layer 12 and a multilayer film 13a on a substrate 11 in this order. The laminated body 10 has characteristics of transmitting first polarized light and reflecting second polarized light having a polarization axis x that intersects a polarization axis y of the first polarized light.

Multilayer Film

As illustrated in FIG. 1, the multilayer film 13a includes a plurality of first layers 131 formed of a crystalline naphthalenedicarboxylic acid polyester and a plurality of second layers 132 formed of a polymer other than the crystalline naphthalenedicarboxylic acid polyester, the first layers and the second layers being alternately stacked on top of each other. The multilayer film 13a is obtained by uniaxially or biaxially stretching a multilayer body constituted by the first layers 131 and the second layers 132. Each of the first layers 131 is preferably formed of a material that exhibits birefringence through stretching and each of the second layers 132 is preferably formed of a material that does not exhibit birefringence even if stretched (that maintains the isotropy). In this case, as a result of the uniaxial stretching or the biaxial stretching, the refractive index of the first layer 131 is higher than that of the second layer 132 on the polarization axis x of the second polarized light, and the refractive index of the first layer 131 is equal to that of the second layer 132 on the polarization axis y of the first polarized light. Consequently, the polarization axis x of the second polarized light serves as a reflection axis, and the polarization axis y of the first polarized light serves as a transmission axis.

The difference in refractive index on the polarization axis x of the second polarized light is preferably 0.2 to 0.3.

The multilayer film 13a has a thermal expansion coefficient of −80 [$10^{-6}$/K] or more at a temperature 3° C. higher than the glass transition point of the multilayer film. When the thermal expansion coefficient of the multilayer film is −80 [$10^{-6}$/K] or more, a laminated body in which formation of creases is favorably suppressed even under high temperature and humidity conditions can be provided. The thermal expansion coefficient at a temperature 3° C. higher than the glass transition point of the multilayer film is more preferably −70 [$10^{-6}$/K] or more. The upper limit of the thermal expansion coefficient at a temperature 3° C. higher than the glass transition point of the multilayer film is preferably 80 [$10^{-6}$/K] or less and more preferably 70 [$10^{-6}$/K] or less from the viewpoint of preventing formation of creases due to stretching of films.

Although the detail is described later, the multilayer film having such a thermal expansion coefficient is obtained by stretching a multilayer film in a polarization axis direction of the first polarized light at a particular stretch factor.

The first layers 131 in the multilayer film 13a are formed of a crystalline naphthalenedicarboxylic acid polyester. Examples of the crystalline naphthalenedicarboxylic acid polyester include polyethylene naphthalate (PEN), polybutylene 2,6-naphthalate (PBN), polyethylene terephthalate (PET), polycarbonate, and acrylic resin (polymethyl methacrylate).

The first layers 131 preferably exhibit birefringence through stretching. The refractive index on the polarization axis y of second polarized light at a wavelength of 550 nm is 1.54 to 1.74, and the refractive index on the polarization axis x of the second polarized light is about 1.6 to about 1.9.

The thickness of the first layers 131 is preferably 60 to 100 nm and more preferably 75 to 85 nm.

The "polymer other than the crystalline naphthalenedicarboxylic acid polyester" of the second layers 132 in the multilayer film 13a refers to a "polymer that is not a crystalline naphthalenedicarboxylic acid polyester", such as a polymer different from the polymer constituting the first layers. The second layers 132 formed of a polymer other than the crystalline naphthalenedicarboxylic acid polyester are preferably formed of a material that does not exhibit birefringence even if stretched (that maintains the isotropy). When the second layers are formed of such a material, the second layers do not have optical anisotropy and thus have a birefringence index of zero. The second layers 132 may be formed of, for example, any polymer that maintains isotropy when stretched. Typical examples of the material that is a polymer other than the crystalline naphthalenedicarboxylic acid polyester and that does not exhibit birefringence even if stretched include copolyesters of naphthalenedicarboxylic acid and terephthalic acid (naphthalenedicarboxylic acid copolyester (coPEN)). The molar ratio of naphthalate and terephthalate is preferably 20:80 to 80:20 and more preferably 70:30.

Other preferred examples of the copolyester include copolyesters constituted by isophthalic acid, azelaic acid, adipic acid, sebacic acid, dibenzoic acid, terephthalic acid, 2,7-naphthalenedicarboxylic acid, 2,6-naphthalenedicarboxylic acid, or cyclohexanedicarboxylic acid. Other suitable varieties in the copolyester are ethylene glycol, propanediol, butanediol, neopentyl glycol, polyethylene glycol, tetramethylene glycol, diethylene glycol, cyclohexanedimethanol, 4-hydroxydiphenol, propanediol, bisphenol A, and 1,8-dihydroxybiphenyl serving as diol reactants and 1,3-bis(2-hydroxyethoxy)benzene.

These copolyesters have a refractive index of about 1.59 to 1.69 on the polarization axis y of the first polarized light. When the multilayer film is produced by co-extrusion of the polymer of the second layers and PEN of the first layers, the polymer of the second layers preferably has a glass transition point compatible with the glass transition point of PEN.

The thickness of the second layers 132 is preferably 65 to 105 nm and more preferably 80 to 90 nm.

For example, the multilayer film 13a is obtained by extruding the polymer of the first layers and the polymer of the second layers and then performing uniaxial stretching or biaxial stretching. The stretching temperature, the stretching rate, the stretching ratio, and the like are appropriately selected so that a desired difference in refractive index is achieved. As a result of the stretching treatment, the refractive index of the first layers (e.g., PEN) is changed to about 1.88 on the polarization axis of the second polarized light, and the refractive index of the second layers (e.g., coPEN) remains at about 1.64. The in-plane stretching ratio of a plane parallel to the stacking surface of the multilayer film having such a difference in refractive index is preferably 5:1.

When the multilayer film is formed by a uniaxial stretching process, examples of the combination of the first layers and the second layers include PEN/coPEN, PET/coPET, PEN/sPS, PET/sPS, PEN/Eastar (polyester or copolyester manufactured by Eastman Chemical Company), and PET/Eastar. When the multilayer film 13a is formed by a biaxial stretching process, examples of the combination of the first layers and the second layers include PEN/coPEN, PEN/PET (polyethylene terephthalate), PEN/PBT (polybutylene terephthalate), PEN/PETG (copolymer of PET using a secondary glycol (e.g., cyclohexanedimethanol)), and PEN/PET-coPBT (copolyester of terephthalic acid or terephthalate and a mixture of ethylene glycol and 1,4-butanediol). In particular, PEN/coPEN is most preferably used.

The total number of the first layers 131 and the second layers 132 stacked is preferably 50 to 300 and more preferably 100 to 200.

Substrate

The substrate used for the laminated body is preferably a transparent substrate. Examples of the substrate include quartz glass, polycarbonate substrates, and acrylic substrates. The "transparency" means that 80% or more of light having a wavelength of 450 nm to 650 nm is transmitted.

Adhesive Layer

The adhesive layer is formed of an adhesive that allows the substrate 11 to adhere to the multilayer film 13a. Examples of the adhesive include (meth)acrylic adhesives, acrylic-urethane adhesives, urethane adhesives, silicone adhesives, and organic-inorganic hybrid adhesives. In particular, (meth)acrylic adhesives are preferably used from the viewpoint of transparency and durability. The "(meth) acrylic" is a collective term for "acrylic" and "methacrylic".

The (meth)acrylic adhesive is, for example, a (meth) acrylic adhesive that uses, as a base polymer, a (meth)acrylic polymer (homopolymer or copolymer) constituted by one or more alkyl (meth)acrylates serving as monomer components. Specific examples of the alkyl (meth)acrylate include C1-20 alkyl (meth)acrylates such as methyl (meth)acrylate, ethyl (meth)acrylate, propyl (meth)acrylate, isopropyl (meth)acrylate, butyl (meth)acrylate, isobutyl (meth)acrylate, s-butyl (meth)acrylate, t-butyl (meth)acrylate, pentyl (meth)acrylate, hexyl (meth)acrylate, heptyl (meth)acrylate, octyl (meth)acrylate, 2-ethylhexyl (meth)acrylate, isooctyl (meth)acrylate, nonyl (meth)acrylate, isononyl (meth)acrylate, decyl (meth)acrylate, isodecyl (meth)acrylate, undecyl (meth)acrylate, dodecyl (meth)acrylate, tridecyl (meth)acrylate, tetradecyl (meth)acrylate, pentadecyl (meth)acrylate, hexadecyl (meth)acrylate, heptadecyl (meth)acrylate, octadecyl (meth)acrylate, nonadecyl (meth)acrylate, and eicosyl (meth)acrylate. In particular, an alkyl (meth)acrylate having a linear or branched alkyl group with 4 to 18 carbon atoms is preferred.

The adhesive layer is formed by applying an adhesive by a publicly known coating method, performing drying, placing the multilayer film on the adhesive layer, and then performing curing using ultraviolet rays.

The thickness of the adhesive layer is preferably 12 μm to 25 μm and more preferably 13 μm to 23 μm.

Method for Producing Laminated Body

A method for producing a laminated body according to an embodiment of the present invention will be described with reference to FIGS. 2A to 2D and FIGS. 3A to 3C.

Figure 2A:
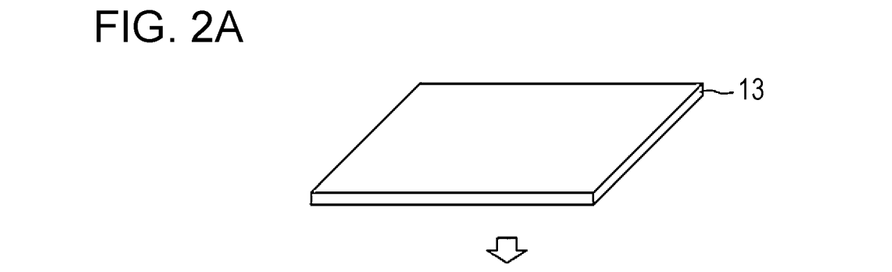
FIGS. 2A to 2D schematically illustrate one embodiment of a method for producing a laminated body.

First, a multilayer film 13 is prepared as illustrated in FIG. 2A. A plurality of first layers 131 and a plurality of second layers 132 are alternately stacked on top of each other and uniaxially stretched to prepare a multilayer film 13.

Figure 2B:
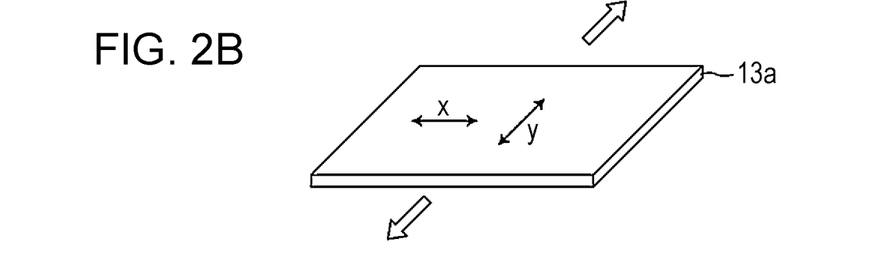

Subsequently, after the breaking length in a direction of the polarization axis y of the first polarized light is determined in advance, as illustrated in FIG. 2B, the multilayer film 13 is stretched by the above method in a direction of the polarization axis y of the first polarized light of the multilayer film 13 to 98% or more of the breaking length in the direction of the polarization axis y of the multilayer film 13 to form a multilayer film 13a. The multilayer film 13 is preferably stretched to 98.5% or more of the breaking length. By stretching the multilayer film 13 to 98% or more of the breaking length, the thermal expansion coefficient of the multilayer film 13a at a temperature 3° C. higher than the glass transition point can be set to −80 [$10^{-6}$/K] or more, which can suppress the formation of creases even under high temperature and humidity conditions. By stretching the multilayer film 13 to 98.5% or more of the breaking length, the thermal expansion coefficient of the multilayer film 13a at a temperature 3° C. higher than the glass transition point can be set to −70 [$10^{-6}$/K] or more.

The relationship between the stretch factor and the percentage of the length to the breaking length depends on the materials and configuration of the multilayer film. For example, in the case of a multilayer film constituted by polyethylene naphthalate and 70-naphthalate/30-terephthalate copolyester, the multilayer film 13a formed by performing stretching to 98% of the breaking length corresponds to a multilayer film formed by stretching the original multilayer film 13 at a stretch factor of about 1%. The multilayer film 13a formed by performing stretching to 98.5% of the breaking length corresponds to a multilayer film formed by stretching the original multilayer film 13 at a stretch factor of about 1.5%. The correlation between the stretch factor and the breaking length is determined in advance, and the stretch factor of the multilayer film is preferably determined so that the multilayer film is stretched to 98% or more of the breaking length.

The phrase "film is broken" specifically means that cross-links between molecules constituting the film are broken. Normally, when a film is stretched, some of cross-links between molecules start to be broken at a certain stage. When the film is further stretched, other cross-links between molecules are also broken. In the end, all cross-links between molecules are broken. The length at which all cross-links between molecules are broken is defined as a breaking length. That is, the length that is smaller than the breaking length by about 2% indicates a state in which most of cross-links between molecules are maintained and the product performance is satisfied, but some of cross-links between molecules are broken. When the film in this state is left to stand at high temperature, most of cross-links between molecules are shrunk, but shrinkage does not occur in portions in which cross-links have been broken. Therefore, the degree of shrinkage is reduced compared with the case where all cross-links between molecules are maintained.

As described above, the present inventors have focused on the relationship between the breaking length and the shrinkage at high temperature from the viewpoint of the molecular structure of a film and have found that formation of creases under high temperature and humidity conditions can be prevented by stretching the film to a length close to the breaking length. Thus, the present invention has been made.

Note that the stretch factor (%) is determined from {(Length after stretching−Original length)/Original length}×100.

Figure 2C:
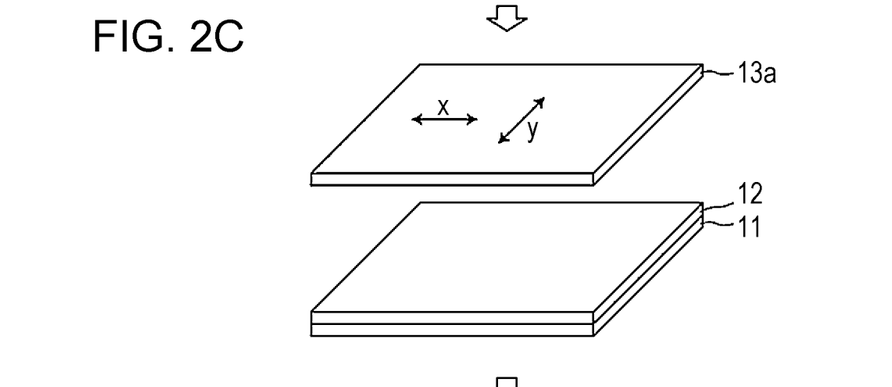

Subsequently, as illustrated in FIG. 2C, the multilayer film 13a is placed on a substrate 11 on which an adhesive layer 12 has been disposed so that the adhesive layer 12 and the multilayer film 13a face each other. The multilayer film 13a and the substrate 11 are bonded to each other using an atmospheric pressure bonding machine. Herein, the multilayer film 13a is fixed by performing air adsorption from the side opposite to the adherend.

Figure 2D:
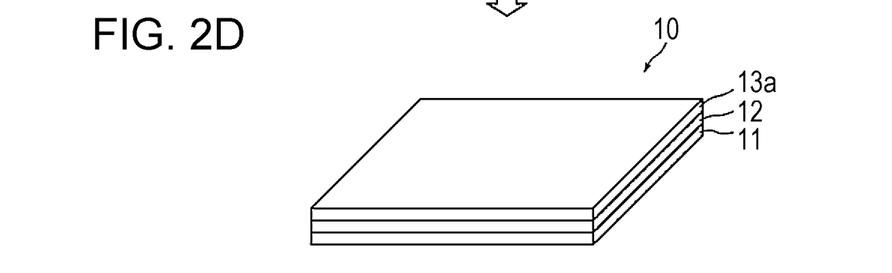

Finally, as illustrated in FIG. 2D, the substrate 11 and the multilayer film 13a are subjected to thermocompression bonding using a heat autoclave machine or the like. The heat autoclave machine is, for example, TK-350 (manufactured by KURIHARA SEISAKUSHO Co., Ltd.).

Figure 3A:
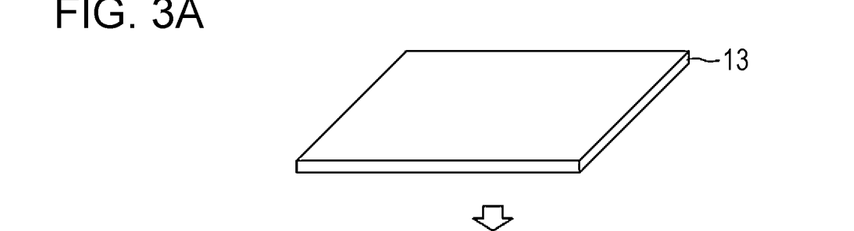
FIGS. 3A to 3C schematically illustrate another embodiment of the method for producing a laminated body.
Figure 3B:
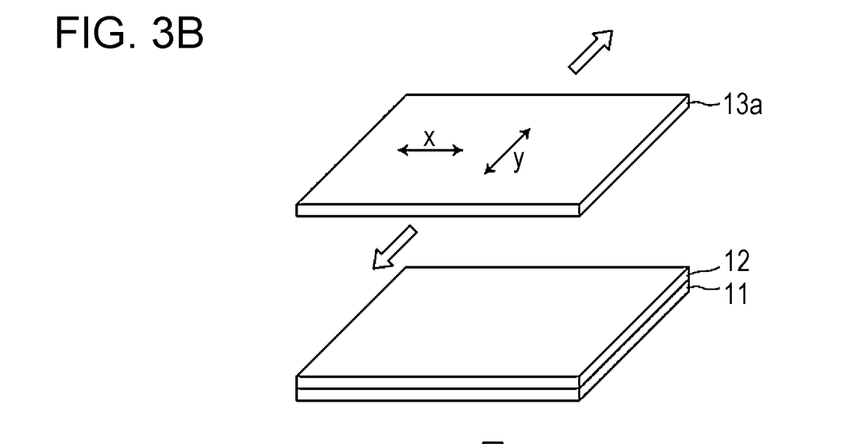
Figure 3C:
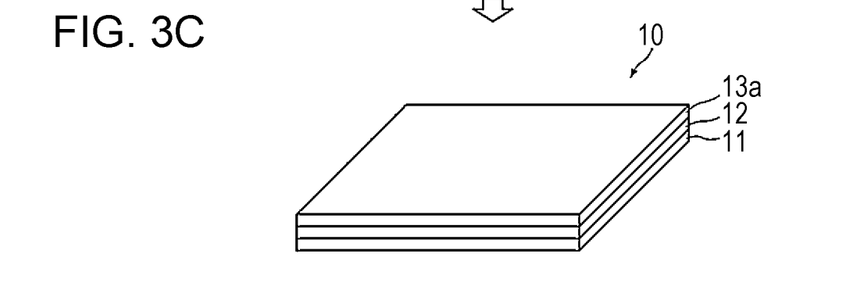

In the above embodiment, the case where the stretching process is performed separately from a bonding process of the multilayer film to the substrate has been described. Alternatively, a multilayer film 13 is prepared as illustrated in FIG. 3A, and then a process of stretching the multilayer film 13 and a bonding process of the multilayer film to a substrate may be performed at the same time as illustrated in FIG. 3B. Any environment may be employed as long as the multilayer film can be bonded to the substrate on which an adhesive layer has been formed immediately after the multilayer film is stretched in the direction of the polarization axis y of the first polarized light. For example, the stretching process and the bonding process can be performed at the same time by using an atmospheric pressure bonding machine including a tensile mechanism. Finally, thermocompression bonding is performed to obtain a laminated body 10 (FIG. 3C).

Rearview Mirror for Vehicles

Figure 4:
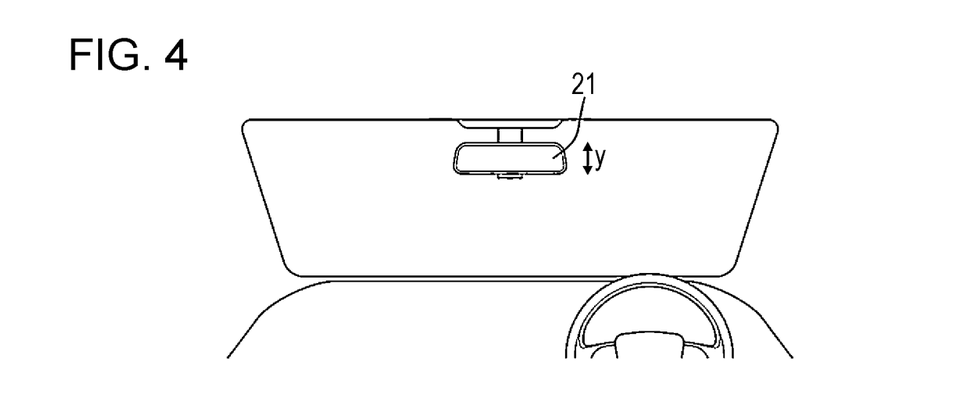
FIG. 4 schematically illustrates a rearview mirror for vehicles.

A rearview mirror for vehicles according to an embodiment of the present invention will be described. FIG. 4 illustrates a rearview mirror for vehicles according to an embodiment. A rearview mirror 21 for vehicles is a mirror display obtained by disposing a laminated body on a surface of a liquid crystal display. The laminated body is bonded so that the short-side direction of the rearview mirror corresponds to the direction of the polarization axis y of the first polarized light. The bonding of the laminated body in this direction is more effective for suppressing formation of creases.

In the case where the rearview mirror for vehicles is used as an image display device, the rearview mirror functions as a half mirror. If the power is off, the rearview mirror reflects natural light and thus simply functions as a rearview mirror.

EXAMPLES

Hereafter, Examples of the present invention will be described, but the present invention is not limited to Examples below.

Example 1

A reflective-type polarizing plate (manufactured by 3M Japan Limited) was provided as a multilayer film 13 that transmits first polarized light, reflects second polarized light having a polarization axis which intersects the polarization axis of the first polarized light, and has a structure in which birefringent polymers were stacked. Then, the reflective-type polarizing plate was stretched by 1% (stretch factor: 1%) in a polarization axis direction of first polarized light using a high-performance film stretching machine FITZ (manufactured by ICHIKIN Co., Ltd.) in an atmosphere of 25° C. and 60%. When the reflective-type polarizing plate was further stretched, the polarizing plate was broken at a stretch factor of 3%. This showed that the length of the polarizing plate stretched by 1% corresponded to 98% of the breaking length.

Measurement of Glass Transition Point and Thermal Expansion Coefficient

The reflective-type polarizing plate stretched by 1% in the polarization axis direction of first polarized light was partly cut into a size of 35 mm×3 mm so as to have long sides extending in the polarization axis direction of first polarized light. The cut reflective-type polarizing plate was subjected to thermomechanical analysis (trade name "TMA" manufactured by Hitachi High-Tech Science Corporation). The glass transition point was 76° C. The thermal expansion coefficient at a temperature 3° C. higher than the glass transition point was −80 $[10^{-6}/K]$ when the long sides extended in the polarization axis direction of first polarized light.

Then, the reflective-type polarizing plate stretched by 1% in the polarization axis direction of first polarized light was cut into a size of 119 mm×69 mm using a slitter. Herein, the polarizing plate was cut so as to have short sides extending in the polarization axis direction of first polarized light.

Subsequently, a quartz glass plate (substrate 11) having a size of 120 mm×70 mm and a thickness of 5 mm was provided, and an adhesive layer 12 having a thickness of 3 μm was formed on the surface of the quartz glass plate. The quartz glass plate and the reflective-type polarizing plate were set in an atmospheric pressure bonding machine so as to face each other and bonded to each other. Herein, the reflective-type polarizing plate was fixed by performing air adsorption from the back of the reflective-type polarizing plate.

Then, a laminated body obtained by bonding the quartz glass plate and the reflective-type polarizing plate was inserted into an autoclave machine YK-350 (manufactured by KURIHARA SEISAKUSHO Co., Ltd.) at a pressure of 0.3 MPa and a temperature of 85° C. and subjected to thermocompression bonding for 3 hours.

The thus-formed laminated body, a liquid crystal panel, and a backlight were assembled in this order so that the reflective-type polarizing plate of the laminated body faced the liquid crystal panel to produce a mirror display.

Example 2

A reflective-type polarizing plate that was not stretched in Example 1 was cut into a size of 119 mm×100 mm using a slitter. Herein, the polarizing plate was cut so as to have short sides extending in the polarization axis direction of first polarized light. Subsequently, the reflective-type polarizing plate and a quartz glass plate which had a size of 120 mm×70 mm and a thickness of 5 mm and on which an adhesive layer having a thickness of 3 μm was formed were set in an atmospheric pressure bonding machine including a tensile mechanism so as to face each other and then bonded to each other. Herein, both long sides of the reflective-type polarizing plate were fixed using clips attached to the tensile mechanism, and the reflective-type polarizing plate and the quartz glass plate were stretched by 1% at a tension of 100 N in a short-side direction (the polarization axis direction of first polarized light) of the reflective-type polarizing plate while at the same time a bonding process was performed. After the completion of the bonding process, a portion of the reflective-type polarizing plate that protruded from the quartz glass plate was cut off.

Example 3

A laminated body was produced in the same manner as in Example 1, except that the stretch factor of the reflective-type polarizing plate was changed to 1.5%. The thermal expansion coefficient at a temperature 3° C. higher than the glass transition point was −70 [$10^{-6}$/K] when the long sides extended in the polarization axis direction of first polarized light. The percentage of the length in the polarization axis direction of first polarized light to the breaking length was 98.5%.

Example 4

A laminated body was produced in the same manner as in Example 2, except that the stretch factor of the reflective-type polarizing plate was changed to 1.5%. The thermal expansion coefficient at a temperature 3° C. higher than the glass transition point was −70 [$10^{-6}$/K] when the long sides extended in the polarization axis direction of first polarized light. The percentage of the length in the polarization axis direction of first polarized light to the breaking length was 98.5%.

Comparative Example 1

A laminated body was produced in the same manner as in Example 1, except that the quartz glass plate and the reflective-type polarizing plate were bonded to each other without stretching the reflective-type polarizing plate. The thermal expansion coefficient at a temperature 3° C. higher than the glass transition point was −100 [$10^{-6}$/K] when the long sides extended in the polarization axis direction of first polarized light. The percentage of the length in the polarization axis direction of first polarized light to the breaking length was 97%.

Comparative Example 2

A laminated body was produced in the same manner as in Example 1, except that the stretch factor of the reflective-type polarizing plate was changed to 0.5%. The thermal expansion coefficient at a temperature 3° C. higher than the glass transition point was −90 [$10^{-6}$/K] when the long sides extended in the polarization axis direction of first polarized light. The percentage of the length in the polarization axis direction of first polarized light to the breaking length was 97.5%.

Comparative Example 3

A laminated body was produced in the same manner as in Example 2, except that the stretch factor of the reflective-type polarizing plate was changed to 0.5%. The thermal expansion coefficient at a temperature 3° C. higher than the glass transition point was −90 [$10^{-6}$/K] when the long sides extended in the polarization axis direction of first polarized light. The percentage of the length in the polarization axis direction of first polarized light to the breaking length was 97.5%.

Evaluation of Surface State: 24 Hours

The mirror display was subjected to a high temperature and humidity test.

The mirror display was left to stand at 85° C. and 85% for 24 hours and then taken out. The surface state was evaluated based on the following evaluation criteria.

Evaluation Criteria

A: Creases were not formed on the mirror display.

B: Creases were formed on the mirror display.

Evaluation of Surface State: 2 Weeks

When the above evaluation result was "A", the test was continued. The mirror display was taken out after two weeks and the surface state was evaluated again based on the above evaluation criteria.

Table 1 shows the evaluation results.

TABLE 1

| | Stretch factor of reflective-type polarizing plate in polarization axis direction of first polarized light | Thermal expansion coefficient at temperature 3° C. higher than glass transition point | Percentage to breaking length | Timing of stretching | Evaluation of surface state 24 hours | Evaluation of surface state 2 weeks |
|---|---|---|---|---|---|---|
| Example 1 | 1% | −80 [$10^{-6}$/K] | 98% | before bonding | A | A |
| Example 2 | 1% | −80 [$10^{-6}$/K] | 98% | simultaneous with bonding | A | A |
| Example 3 | 1.5% | −70 [$10^{-6}$/K] | 98.5% | before bonding | A | A |
| Example 4 | 1.5% | −70 [$10^{-6}$/K] | 98.5% | simultaneous with bonding | A | A |
| Comparative Example 1 | 0% | −100 [$10^{-6}$/K] | 97% | not stretched | B | — |
| Comparative Example 2 | 0.5% | −90 [$10^{-6}$/K] | 97.5% | before bonding | B | — |
| Comparative Example 3 | 0.5% | −90 [$10^{-6}$/K] | 97.5% | simultaneous with bonding | B | — |

As shown in Table 1, creases were not formed in Examples 1 to 4 in which the reflective-type polarizing plate was stretched to 98% or more of the breaking length in advance. It is also found that both the case where stretching was performed before bonding and the case where stretching and bonding were performed at the same time did not affect the evaluation of surface state. In both the cases, a good surface state was achieved without forming creases.

In contrast, creases were formed in Comparative Example 1 in which the reflective-type polarizing plate was not stretched in advance and in Comparative Examples 2 and 3 in which the percentage to the breaking length was less than 98%.

REFERENCE SIGNS LIST 10 laminated body
11 substrate
12 adhesive layer
13 multilayer film
131 first layer
132 second layer
13a (stretched) multilayer film
21 rearview mirror for vehicle

What is claimed is:

1. A laminated body sequentially comprising:
a substrate;
an adhesive layer; and
a multilayer film,
wherein the laminated body has characteristics of transmitting first polarized light and reflecting second polarized light having a polarization axis that intersects a polarization axis of the first polarized light,
the multilayer film includes a plurality of first layers formed of a crystalline naphthalenedicarboxylic acid polyester and a plurality of second layers formed of a polymer other than the crystalline naphthalenedicarboxylic acid polyester, the first layers and the second layers being alternately stacked on top of each other,
the first layers of the multilayer film have a higher refractive index than the second layers on the polarization axis of the second polarized light, and
the multilayer film has a thermal expansion coefficient of $-80 \times 10^{-6}$/K or more at a temperature 3° C. higher than a glass transition point of the multilayer film in a polarization axis direction of the first polarized light.

2. The laminated body according to claim 1, wherein the multilayer film is stretched in the polarization axis direction of the first polarized light to 98% or more of a breaking length at 25° C. in the polarization axis direction.

3. A method for producing the laminated body according to claim 1, the method comprising:
setting the thermal expansion coefficient of the multilayer film to $-80 \times 10^{-6}$/K or more; and
then bonding the multilayer film and the substrate with the adhesive layer disposed therebetween.

4. A method for producing the laminated body according to claim 2, the method comprising:
setting the thermal expansion coefficient of the multilayer film to $-80 \times 10^{-6}$/K or more; and
then bonding the multilayer film and the substrate with the adhesive layer disposed therebetween.

5. The method for producing a laminated body according to claim 3, wherein the multilayer film is stretched in the polarization axis direction of the first polarized light to set the thermal expansion coefficient to $-80 \times 10^{-6}$/K or more.

6. The method for producing a laminated body according to claim 4, wherein the multilayer film is stretched in the polarization axis direction of the first polarized light to set the thermal expansion coefficient to $-80 \times 10^{-6}$/K or more.

7. A rearview mirror for vehicles, comprising the laminated body according to claim 1,
wherein a short-side direction of the rearview mirror for vehicles corresponds to the polarization axis direction of the first polarized light.

8. A rearview mirror for vehicles, comprising the laminated body according to claim 2,
wherein a short-side direction of the rearview mirror for vehicles corresponds to the polarization axis direction of the first polarized light.

* * * * *